Aug. 2, 1938.  G. D. WEIR  2,125,760
APPARATUS FOR MOLDING, BLOCKING, OR OTHERWISE
SHAPING MATERIALS, HATS, OR ARTICLES
Filed April 9, 1935   2 Sheets-Sheet 1
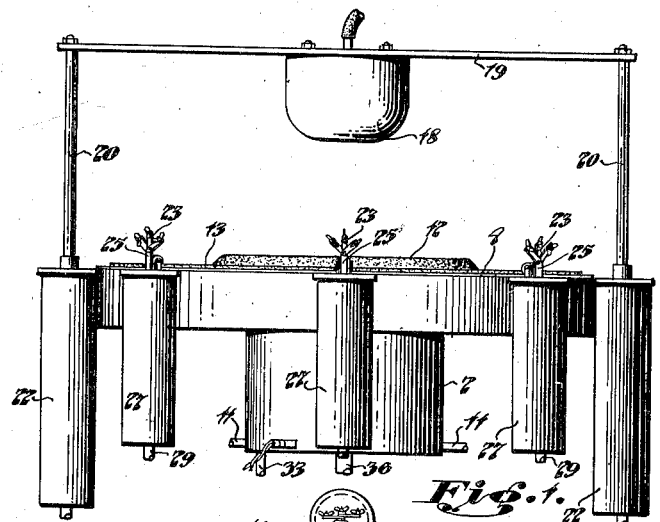
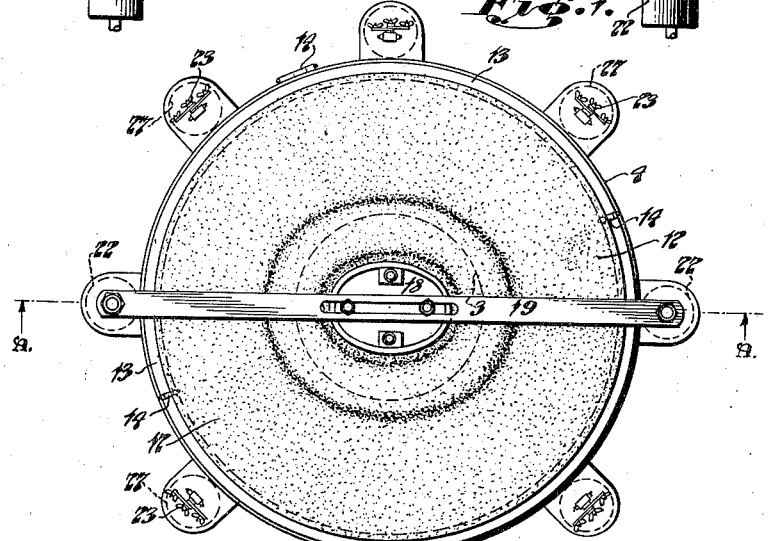
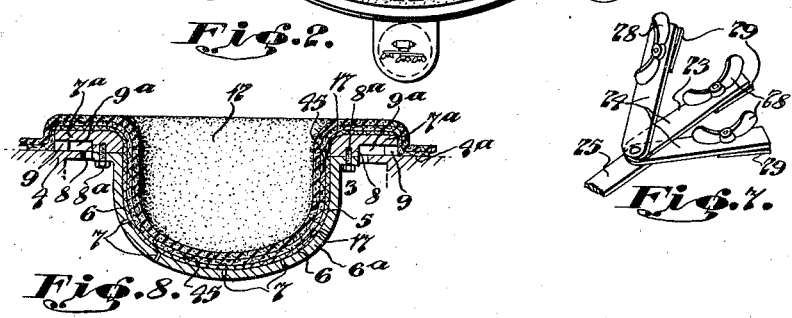
G. D. Weir
INVENTOR
By: Glascock Downing Seebold
Attys.

Aug. 2, 1938. G. D. WEIR 2,125,760
APPARATUS FOR MOLDING, BLOCKING, OR OTHERWISE
SHAPING MATERIALS, HATS, OR ARTICLES
Filed April 9, 1935 2 Sheets-Sheet 2
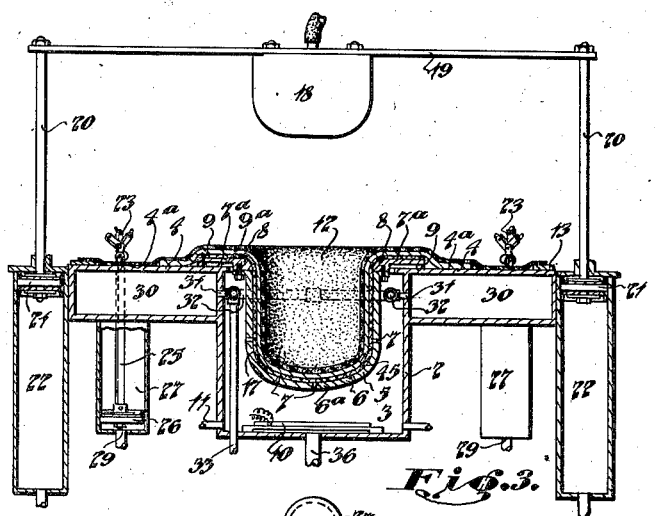
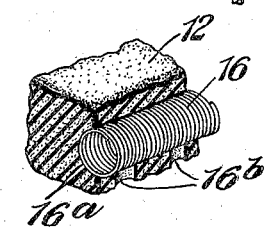
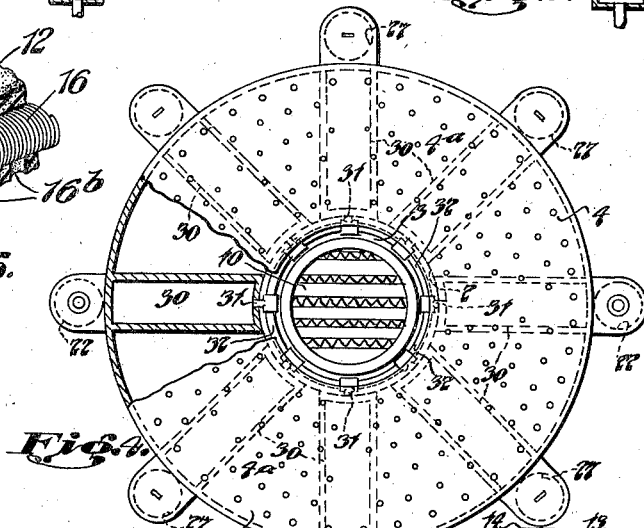
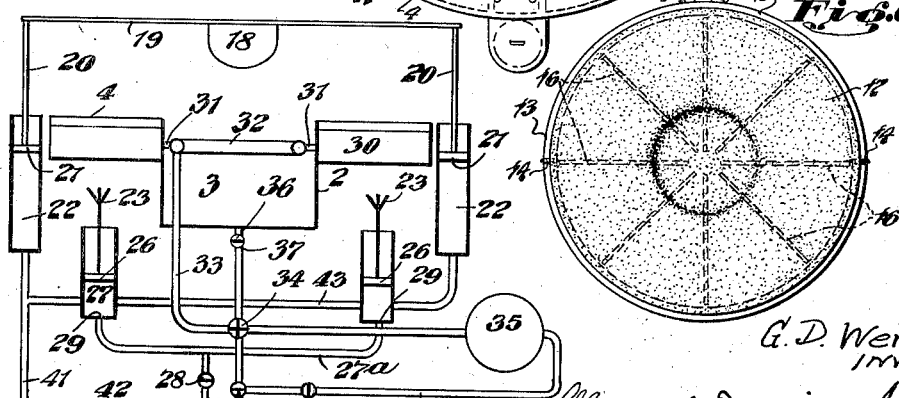
G. D. Weir
Inventor Patented Aug. 2, 1938

2,125,760

UNITED STATES PATENT OFFICE 2,125,760

APPARATUS FOR MOLDING, BLOCKING, OR OTHERWISE SHAPING MATERIALS, HATS, OR ARTICLES

George David Weir, Caulfield, Victoria, Australia

Application April 9, 1935, Serial No. 15,469
In Australia April 21, 1934

6 Claims. (Cl. 223—13)

This invention has reference to improved apparatus for molding, blocking or otherwise shaping materials or substances such as felts, fabrics, velvet, leather goods, straw hats, and has been devised to provide such apparatus that will readily mold or shape the materials specified to the desired shape or contour in a more efficient and expeditious manner than has hitherto been achieved.

The invention has for its object the production of apparatus to effect the blocking and shaping of felt or fabric hats or like articles and in which vacuum pressure is used in conjunction with compressed air to effect the co-operation between a fixed molding member, a movable molding or stretching member and a resilient molding member or bag whereby fabric, straw or felt disposed on the fixed molding member is firstly subjected to an initial molding or stretching operation by vacuum pressure drawing the movable member into engagement with the material while the disengagement of the movable member by compressed air permits the resilient molding member or bag to be brought into engagement by vacuum with the partly formed hat and thereby engage with the entire surface thereof to effect the shaping and blocking of the hat.

It is a feature of the invention that during the initial molding or stretching operation by the movable mold above described, stretching mechanism is synchronously actuated to exert an outward pressure on the brim of the hat or article simultaneously with the crown being stretched into shape whereby the desired complete shape and size of the brim and crown is achieved.

In order that the invention may be more readily understood reference will now be made to the accompanying drawings in which:—

Figure 1 is a side elevation of apparatus constructed in accordance with this invention and as applied to the manufacture of hats or like articles, and—

Figure 2 is a plan thereof.

Figure 3 is a section taken on line A—A on Figure 2.

Figure 4 is a plan of the apparatus with the resilient molding member and fixed mold removed.

Figure 5 is a detail in section of the resilient molding member, and—

Figure 6 is a plan thereof.

Figure 7 is a detail of the brim stretching mechanism.

Figure 8 is a central section of the fixed mold with a hat in position thereon and the resilient molding member in the operative position.

Figure 9 is a diagrammatic view of the pipe circuit for controlling the supply of vacuum and compressed air.

According to one form of carrying this invention into practical effect and as illustrated in Figures 1 to 3 of the accompanying drawings, the apparatus may be utilized in one application for the shaping, molding and blocking of felt or straw hats or like articles, the apparatus having as its pressure creating medium the utilization of vacuum independently or in conjunction with compressed air.

The apparatus comprises a cylindrical casing 2 to provide a main vacuum chamber 3 open at the top and around which is formed a perforated plate or table 4 preferably circular and formed integral with the casing 2. The casing 2 is adapted to seat on a work bench or structure at a height convenient for the workman to operate over the perforated plate or table 4. Mounted in the open top of the vacuum chamber 3 which constitutes a recess in the perforated table 4 is an interchangeable hat mold 5 of the desired configuration according to the predetermined shape of the hat or article to be molded and blocked.

The mold 5 is of a recessed or hollow nature with the hollow portion 6 having substantially small perforations 7 therein or passages to communicate with the interior of the vacuum chamber 3. The flange 7ª of the mold 5 is detachable from the perforated body portion 6 by spaced lugs 8 adapted to receive studs or bolts 8ª. The flange 7ª of the mold 5 is suitably shaped to accord with the shape it is desired to impart to the brim of the hat. The formation of the perforated mold 5 in two parts permits the production of hats having varied sized crowns and peculiarly shaped brims to accord with the prevailing fashion.

The flange 7ª of the mold 5 is provided at its periphery with downturned circumferential lugs 9 whereby a space or clearance 9ª is provided between the inside of the flange and the top 4ª of the perforated table 4 for the purpose hereinafter described.

Disposed within the vacuum chamber 3 at the bottom thereof is an electric or other heater 10 while a steam pipe 11 is connected thereto to maintain the felt or like material in a heated and soft pliable condition to facilitate the ready working and blocking thereof in accordance with standard practice.

A resilient pressure creating molding member or bag 12 is positioned on the upper surface of the perforated plate or table 4 to cover the entire surface thereof. The resilient molding member 12 is supported in a hinged frame 13 mounted on the edge of the perforated table 4, a double hinge formation 14 being provided as illustrated in Figure 2 to facilitate the folding back of the said resilient member clear of the fixed mold 5. The resilient member 12 is preferably composed of a readily elastic and resilient agent or material such as rubber. Formed transversely and longitudinally or radially through the thickness of the rubber member 12 are a plurality of tubular reinforcements 16 which may be in the form of metallic tubes, or tubes helically wound with wire or like material. As shown in Figure 5 the helically wound reinforcements 16 are porous to permit the withdrawal of air from the passages 16ª, accommodating said reinforcements through spaced holes or ducts 16ᵇ formed on the underside of the resilient member 12.

The resilient member 12 is constructed in the manner of a bag whereby, under pressure, sufficient material is available to permit the same being drawn into the recess or hollow 6 of the fixed perforated mold 5. The perforations in the table 4 prevent the formation of air pockets between it and the marginal portion of the resilient member 12 and permit the latter to lie flat upon the table 4.

It will be understood that although the fixed mold 5 is illustrated in this embodiment of the invention as being of a hollow or recessed nature, it could be inverted to assume an upraised position on the perforated table.

The passages 16ª with the tubular reinforcements 16 in the resilient member 12 are of particular utility in that a dual purpose is achieved of reinforcing the material and providing passages therein to permit the ready withdrawal of air through the ducts 16ᵇ from all parts of the resilient member 12 when same is subjected to the action of vacuum to ensure that the resilient member 12 conforms exactly to the hat or article 17 positioned in and on the fixed perforated mold 5 to impart pressure thereto to effect the blocking operation, as will be hereinafter described.

Superimposed above the fixed perforated mold 5 and in direct operative alignment therewith, is a movable mold or stretcher 18 which is adjustably mounted on a crosshead 19 diametrically disposed above the perforated table 4 to be connected at each extremity to the upper end of a piston rod 20. Each piston rod 20 is fitted to a piston 21 mounted in enclosed cylinders 22 vertically positioned and suitably supported in relation to the perforated table 4. The function of each piston 21 is that on the admission of vacuum or suction to the underside of the pistons same are drawn downwardly in their respective cylinders 22 to bring the movable mold or stretcher 18 into the recess or hollow 6 of the fixed perforated hollow or mold 5. The movable mold or stretcher 18 is the male member and is shaped and of a size to provide a working fit within the fixed mold 5 when a hat or article is positioned therein.

The apparatus is provided with stretching mechanism to effect a stretching operation on the brim of the hat or article simultaneously with the descent of the movable mold or stretcher 18 as illustrated in Figures 2 and 3. The stretcher mechanism comprises gripping elements 23 which are adapted to operate under vacuum pressure to draw the brim of the hat 17 outwardly simultaneously with the crown being stretched by the mold 18. The gripping elements 23 comprise a plurality of pivoted fingers 24 connected to a flexible and substantially flat and narrow strap 25, which in each instance is fitted to the upper end of a piston 26. The pistons 26 are mounted in cylinders 27 radially disposed around the perforated plate or table 4. Each inner end of the pivoted fingers 24 has fitted thereto a thumb screw 28 and cleat 29 in order that the adjacent edge of the brim of the hat or article 17 may be gripped and fastened between the pivoted fingers 24. In this manner the periphery of the brim of the hat or article 17 is at selected spaced intervals gripped by the pivoted fingers 24 fastened thereto in the manner illustrated, each set of fingers 24 having a common flexible extension 25 to an independent piston 26 the cylinder 27 of which has a port 29 at the base whereby, on the admission of vacuum to the respective cylinders 27, each piston 26 is drawn downwardly to exert a pull on the flat extensible lead 25 to exert a stretching pressure on the brim of the hat or article.

Each of the cylinders 27 is connected by a common pipe 27ª this pipe being connected by valve 28 to vacuum or compressed air.

A plurality of spaced and inter-related compartments 30 are formed radially around the main casing 2, as illustrated more particularly in Figures 2 and 3 of the drawings. The compartments 30 are disposed below the perforated plate or table 4 and at their inner extremities are provided with passages 31 which extend into a tube 32 which is common to all the compartments 30, the outer ends of which are sealed.

The tube 32 has a pipe 33 connected thereto which extends through a four way valve 34 to a combined vacuum and compressed air pump 35 while the four way valve 34 has a union connecting a pipe 36 which extends through a check valve 37 to the main vacuum chamber 3. The compressed air section of the combined pump 35 has a pipe 38 leading through a check valve 39 and two-way cock 40 to the pipe 41 which extends through check valve 42 to the cylinders 22 for operating the crosshead 19 and movable mold 18.

The pipe 33 from the compartments 30 to the four-way valve 34 and two-way valve 40 is adapted to admit vacuum or suction to the bottom of one of the cylinders 22 in which is operatively disposed the pistons 21 for raising and lowering the crosshead 19 carrying the movable mold or stretcher 18, a supply pipe 43 being connected to the pipe 41 to by-pass suction or vacuum to the other co-acting cylinder 22 supporting the crosshead 19.

The operation of the apparatus is as follows:—

In accordance with accepted practice a felt or straw hat or like article is firstly shaped on a wooden frame to the approximate shape and size desired; the felt or fabric during this operation is softened with steam or other agents to make it soft and pliable. The partly formed hat or article 17 is then in a condition to be placed on the fixed perforated mold 5; the brim of the hat 17 rests on the shaped flange 7ª of the mold 5 while the crown seats in the hollow or recess 6 of said mold. Prior to placing the hat 17 in position the four-way valve 34 is adjusted to admit suction to the plurality of storage compartments 30 disposed below the perforated table 4 to evacuate said compartments.

A felt liner 45 is positioned over the hat or article disposed in the fixed mold 5. The fixed mold is perforated as at 7 and the porosity of the felt hat and liner 45 is such that when vacuum or suction is exerted from the main chamber the resilient molding member 12 is drawn into the recess 6 of the fixed mold 5.

After the vacuum storage compartments 30 have been evacuated and the partly formed hat 17 and felt liner 45 has been disposed in the fixed mold 5, vacuum is admitted to the cylinders 22 incorporating the pistons 21 to operate a crosshead 19.

The admission of vacuum to the said cylinders 22 draws the pistons 21 downwardly and the movable mold or stretcher 18 is drawn into the felt liner 45 to impart the initial molding or stretching operation.

If the hat or article is composed of straw or like material the lower section 6a of the fixed mold 5 may be dispensed with and then a stretching operation only is imparted to the crown of the hat 17 by the movable mold or stretcher 18.

Simultaneously with the operation described vacuum is admitted to the cylinders 27 incorporating the pistons 26 which connect the flat extensible straps 25 of the pivoted fingers constituting the brim stretching mechanism. All the pistons 26 are synchronously drawn downwardly in their respective cylinders 27 which moves the extensible straps 25 outwardly from the brim of the hat or article 17 whereby the pivoted fingers 24 impart a stretching pressure to the brim around the entire periphery thereof. As this action takes place simultaneously with the movable mold or stretcher 18 imparting the initial molding or stretching operation to the crown of the hat or article, the same is therefore stretched and partly formed to the predetermined shape.

After the crown of the hat has been subjected to the stretching operation by adjusting the fourway valve 34 and check valve 28, compressed air is admitted to the cylinders 22 which incorporate the pistons 21 carrying the crosshead 19 whereby said pistons 21 are forced upwardly in their respective cylinders 22 to elevate the crosshead 19 which withdraws the movable mold or stretcher 18 to its upper inoperative position. By closing the check valve 42 the crosshead 19 will remain in the upper position for a period sufficient at least to permit the completion of the molding and blocking of the hat or article. The stretching mechanism is retained in the operative position, that is, the cylinders 27 in which the respective pistons 26 are mounted to actuate said mechanism are retained under vacuum. The resilient molding member is then adjusted by its double hinge formation to cover the entire surface of the perforated table 4.

In accordance with the pipe circuit illustrated in Figure 9, the fourway valve 34 is then adjusted to connect the vacuum storage compartments 30 with the main vacuum chamber 3. The resilient molding member 12 is, when valves 37 and fourway valve 34 are operated subjected over its entire effective area to the influence of vacuum, that is, all the air in the resilient member 12 is withdrawn owing to the differential of air pressures between the main vacuum compartment 3 and the storage compartments 30 whereby the main vacuum chamber 3 is evacuated and air is withdrawn from the inside of the resilient member 12 to cause the same to extend into and conform to the shape of the partly formed hat 17 in the fixed mold 5.

The fourway valve 34 is then again adjusted to disconnect the compartments 34 with the main chamber 3 and connect the same with the vacuum pump 35 whereby continuous suction is exerted on the main chamber 3. Suction is therefore exerted through the perforated mold 5, hat or article 17 and felt liner 45, on to the surface of the resilient member 12 engaging with and in conformity with the partly formed hat or article.

The continued pumping operation exerts pressure on the resilient member 12 and draws it forcibly against the inside of the felt liner 45 and the surface of the flange thereof whereby the hat or article within the liner is blocked to the predetermined shape. The substantially flat and narrow formation of the extensible members 25 attached to the gripping elements 24 does not affect the positive closure of the resilient molding member 12 under the influence of the vacuum exerted from the main chamber.

After the blocking operation described has been effected, the fourway valve 34 is closed and compressed air is passed through the twoway valve 40 through check valve 28 into the distributing pipe 27a to each of the cylinders 27 which have the pistons 26 therein to actuate the stretching mechanism. The tension is released in the gripping elements 23 by the pistons 26 in the cylinders 27 rising under the action of the compressed air and therefore the same may be detached from the brim of the hat after the vacuum has been broken in the main chamber.

By breaking the vacuum in the main chamber on the admission of atmosphere or compressed air through the pipe system described, the resilient molding member 12 may be folded back from its double hinge clear of the perforated mold 5 to permit the removal of the blocked hat or article from said mold.

As the pistons 21 which carry a crosshead 19 and support the gripping elements respectively are raised to the inoperative position by the admission of compressed air below said pistons 21 the latter will drop after the compressed air has been cut off and, therefore, before the apparatus can be used to block or mold a new hat or article compressed air would have to be again admitted to the underside of said pistons to raise the crosshead 19 to its normal position and cause the gripping elements to assume a position for attachment respectively.

What I claim as my invention and desire to secure by Letters Patent is:—

1. Apparatus for molding, blocking or otherwise shaping materials comprising a casing having a vacuum chamber therein, a perforated fixed mold on said casing to receive a hat or article to be shaped or molded, a movable mold adapted under the action of vacuum and compressed air to engage and disengage respectively with said fixed mold, means to stretch the brim of said hat outwardly synchronously with the movable mold engaging with the fixed mold and a resilient pressure creating and molding member mounted on said casing to close on to and grip the hat or article on said fixed mold after the movable mold has been displaced from engagement therewith.

2. Apparatus for molding, blocking or otherwise shaping material comprising a casing having a vacuum chamber therein, a perforated table disposed above said casing, a fixed perforated and interchangeable mold disposed in said table on and over the vacuum chamber to receive a partly formed hat or article, a movable mold operatively disposed above the fixed mold and adapted under the action of vacuum and compressed air to engage and disengage respectively with the fixed mold, stretching mechanism on the perforated table to grip and stretch the brim of said hat or article synchronously with the movement and engagement of the movable mold with the fixed mold, and a resilient pressure creating and molding member hingedly mounted on said table and adapted under the action of vacuum to grip and forcibly conform to the shape of the hat or article on the fixed mold to effect the blocking thereof after the movable mold has been returned to the inoperative position.

3. In apparatus for molding, blocking or otherwise shaping materials, a fixed perforated mold to receive a partly formed hat or article, a movable mold adapted to engage and disengage respectively with said fixed mold, stretching mechanism to grip and stretch a brim on the hat or article, a resilient molding member to exert pressure on the hat or article, the movable mold, stretching mechanism and resilient molding member being operated to shape the hat or article under the action of vacuum, the said movable mold and stretching mechanism being returnable to a normal position by the action of compressed air.

4. Apparatus for molding, blocking or otherwise shaping materials, comprising a casing having a vacuum chamber therein, a perforated table mounted on said casing, a fixed perforated mold disposed on and over said casing, a plurality of vacuum storage compartments arranged below and in valve controlled communication with said vacuum chamber whereby vacuum may be imparted from said compartments to said chamber to withdraw air through the perforated mold, and an imperforate resilient pressure-creating and molding member disposed on the perforated table adapted, when air is withdrawn through the perforated mold, to conform to and forcibly engage with a material, substance, hat or article disposed on said perforated mold for the purposes herein specified.

5. In apparatus for molding, blocking or otherwise shaping materials comprising a casing having a vacuum chamber therein, a perforated fixed mold on said casing to receive the material, substance, hat or article to be shaped or molded, a movable mold adapted under the action of vacuum and compressed air to engage and disengage respectively with the fixed mold, and an imperforate resilient pressure-creating and molding member adapted under the action of vacuum to close on to, grip and conform to the shape of the material, substance, hat or article on said fixed mold after the movable mold has been displaced from engagement therewith, perforate tubular reinforcements disposed within the resilient pressure creating and molding member to form internal passages therein and spaced ducts formed in the underside of said member to communicate with said passages.

6. Apparatus for blocking or otherwise shaping materials, comprising a casing having a vacuum chamber therein, a perforated table on said casing, a fixed mold detachably mounted in the top of the vacuum chamber with the flange of said mold seating in spaced relationship on the perforated table, said mold being perforated and hollow to receive the crown of a partly formed hat or article with the brim thereof impinging on the flange, a movable mold operatively disposed above the fixed mold, a crosshead on which the movable mold is mounted, vacuum operated means connected with the crosshead to lower the movable mold into the fixed mold, said movable mold being returnable to the inoperative position under the action of compressed air, a plurality of gripping elements to engage at selected positions with the brim of the hat or article to stretch the same outwardly during the descent and operation of the movable mold, said stretching mechanism being returnable to the inoperative position under the action of compressed air, and a resilient pressure-creating and molding member hingedly mounted on the perforated table adapted under the action of vacuum to close on to and forcibly engage with the hat or article after the movable mold has been returned to the inoperative position.

GEORGE DAVID WEIR.